(12) United States Patent
Martino et al.

(10) Patent No.: US 11,651,097 B2
(45) Date of Patent: May 16, 2023

(54) DOCUMENT SECURITY ENHANCEMENT

(71) Applicant: International Business Machines Corporation, Armonk, NY (US)

(72) Inventors: Mauro Martino, Cambridge, MA (US); Steven I. Ross, South Hamilton, MA (US); Fang Lu, Billerica, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 16/810,705

(22) Filed: Mar. 5, 2020

(65) Prior Publication Data

US 2021/0279349 A1 Sep. 9, 2021

(51) Int. Cl.
| | |
|---|---|
| *G06F 21/62* | (2013.01) |
| *G06F 21/32* | (2013.01) |
| *G06N 20/00* | (2019.01) |
| *G02B 27/00* | (2006.01) |
| *G06V 30/413* | (2022.01) |
| *G06F 18/214* | (2023.01) |
| *G06V 10/774* | (2022.01) |
| *G06V 40/16* | (2022.01) |

(52) U.S. Cl.
CPC ..... *G06F 21/6227* (2013.01); *G02B 27/0093* (2013.01); *G06F 18/2148* (2023.01); *G06F 21/32* (2013.01); *G06F 21/6209* (2013.01); *G06N 20/00* (2019.01); *G06V 10/7747* (2022.01); *G06V 30/413* (2022.01); *G06V 40/172* (2022.01); *G06F 2221/2149* (2013.01)

(58) Field of Classification Search
CPC .. G06N 20/00; G06V 30/413; G06F 21/6209; G06F 21/32; G06F 2221/2149; G06K 9/6257; G02B 27/0093
See application file for complete search history.

(56) References Cited

U.S. PATENT DOCUMENTS

| | | | |
|---|---|---|---|
| 4,805,222 | A | 2/1989 | Young |
| 9,280,652 | B1 | 3/2016 | Bozarth |
| 9,355,612 | B1 | 5/2016 | Shepard |
| 9,600,688 | B2 | 3/2017 | Buck |
| 9,939,897 | B2 | 4/2018 | Gohl |
| 10,168,771 | B2 | 1/2019 | Abou Mahmoud |

(Continued)

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Ashokkumar B Patel
*Assistant Examiner* — William B Jones
(74) *Attorney, Agent, or Firm* — Sherman IP LLP; Kenneth L. Sherman; Steven Laut

(57) ABSTRACT

A method of providing, by a computing device, access to a user of sections of an electronic document. The method includes receiving, by a computing device, a computerized image of a user accessing an electronic document. The computing device further accesses a facial recognition database and compares the computerized image to one or more entries in the facial recognition database to determine an identity of the user. The user is provided access to one or more sections of the electronic document based upon the identity of the user.

20 Claims, 11 Drawing Sheets

(56) References Cited

U.S. PATENT DOCUMENTS

| | | | |
|---|---|---|---|
| 2005/0099398 A1* | 5/2005 | Garside | G06F 3/04883 |
| | | | 345/173 |
| 2009/0273562 A1 | 11/2009 | Baliga | |
| 2013/0262864 A1* | 10/2013 | Hamid | G06F 21/6227 |
| | | | 713/165 |
| 2014/0078039 A1* | 3/2014 | Woods | H04N 21/4318 |
| | | | 345/156 |
| 2018/0239931 A1 | 8/2018 | Ziaja | |
| 2020/0320289 A1* | 10/2020 | Su | G06V 10/82 |
| 2021/0216859 A1* | 7/2021 | Liu | G06N 3/0454 |

OTHER PUBLICATIONS

Garcia, C. et al., "Facial Image Processing", EURASIP Journal on Image and Video Processing, Dec. 12, 2007, pp. 1-3, vol. 2007, Hindawi Publishing Corporation, United Kingdom.

Mallick, S., "Head Pose Estmation using OpenCV and Dlib", Learn OpenCV, Sep. 26, 2016, pp. 1-26, downloaded Mar. 5, 2020, https://www.learnopencv.com/head-pose-estimation-using-opencv-and-dlib/, United States.

* cited by examiner

1100

Receiving, By A Computing Device, A Computerized Image Of A User Accessing An Electronic Document

1110

Accessing, By The Computing Device, A Facial Recognition Database And Comparing The Computerized Image To One Or More Entries In The Facial Recognition Database To Determine An Identity Of The User

1120

Providing The User Access To One Or More Sections Of The Electronic Document Based Upon The Identity Of The User

DOCUMENT SECURITY ENHANCEMENT

BACKGROUND

The field of embodiments of the present invention relates to user access for sections of an electronic document.

Allocating access to a document is a crucial aspect of any modern computational environment. For example, the creator of a new document can grant access to individuals by configuring a password. The range of possible granted actions applied to the document could also be configured (e.g., allowing/limiting editing, disabling saving, reading-only, etc.).

More advanced existing mechanisms allow granting multiple levels of access to different users who approach the document. For example, the creator can grant read-only access permission to a group of users and edit access permission to another group. Existing methods also allow security management of a document in collaborative environments.

Additional document security mechanisms allow logging the actions applied to the document. For example, when multiple users work on a document it is possible to find out for each character in the document details such as: who created it, when it was created, was it edited and, if so, who and when, deletions, etc. While widely used, existing document security mechanisms have the limit that they are not capable of tracing which user actually read specific sections of a certain document. Furthermore, another limit is that individuals who were not permitted to view certain sections of the document actually read them.

SUMMARY

Embodiments relate to user access for one or more sections of an electronic document. One embodiment provides a method of providing, by a computing device, access to a user of sections of an electronic document. The method includes receiving, by a computing device, a computerized image of a user accessing an electronic document. The computing device further accesses a facial recognition database and compares the computerized image to one or more entries in the facial recognition database to determine an identity of the user. By continually processing the features, the system provides an advantage of increased security for creating, accessing, editing, and viewing textual documents. A user then is provided access to one or more sections of the electronic document based upon the identity of the user. Identifying a user in real-time relative to the document's current section that is viewed/edited/deleted further contributes to the advantage of achieving significant increased security levels over existing document-security methods. Processing facial features further contributes to the advantage of monitoring a document at the level of individual text characters by assigning all user identities that are associated with each character of a document.

One or more of the following features may be included. In some embodiments, the user is prevented from accessing one or more further sections of the electronic document based upon the identity of the user.

In some embodiments, determining an eye gazing location of the user is determined and the user is provided access to one or more further sections of the electronic document based upon the eye gazing location. In some embodiments, document actions for each user are tracked using metadata.

In one or more embodiments, feature values are extracted from the computerized image and from further received computerized images. A machine learning (ML) process is trained using training data including the feature values and user identities associated with the computerized images. An ML data structure is generated using the training data.

In some embodiments, access to the one or more sections of the electronic document is determined using the ML data structure. In one embodiment, access to the one or more sections of the electronic document is determined based on each character of the one or more sections of the electronic document.

In one or more embodiments, it is determined whether a particular user has viewed the one or more sections of the electronic document, and access privileges are assigned on a character by character basis for the one or more sections of the electronic document.

These and other features, aspects and advantages of the present embodiments will become understood with reference to the following description, appended claims and accompanying figures.

BRIEF DESCRIPTION OF THE DRAWINGS

FIG. 11 illustrates a block diagram of a process for document security enhancement, according to one embodiment.

DETAILED DESCRIPTION

Figure 1:
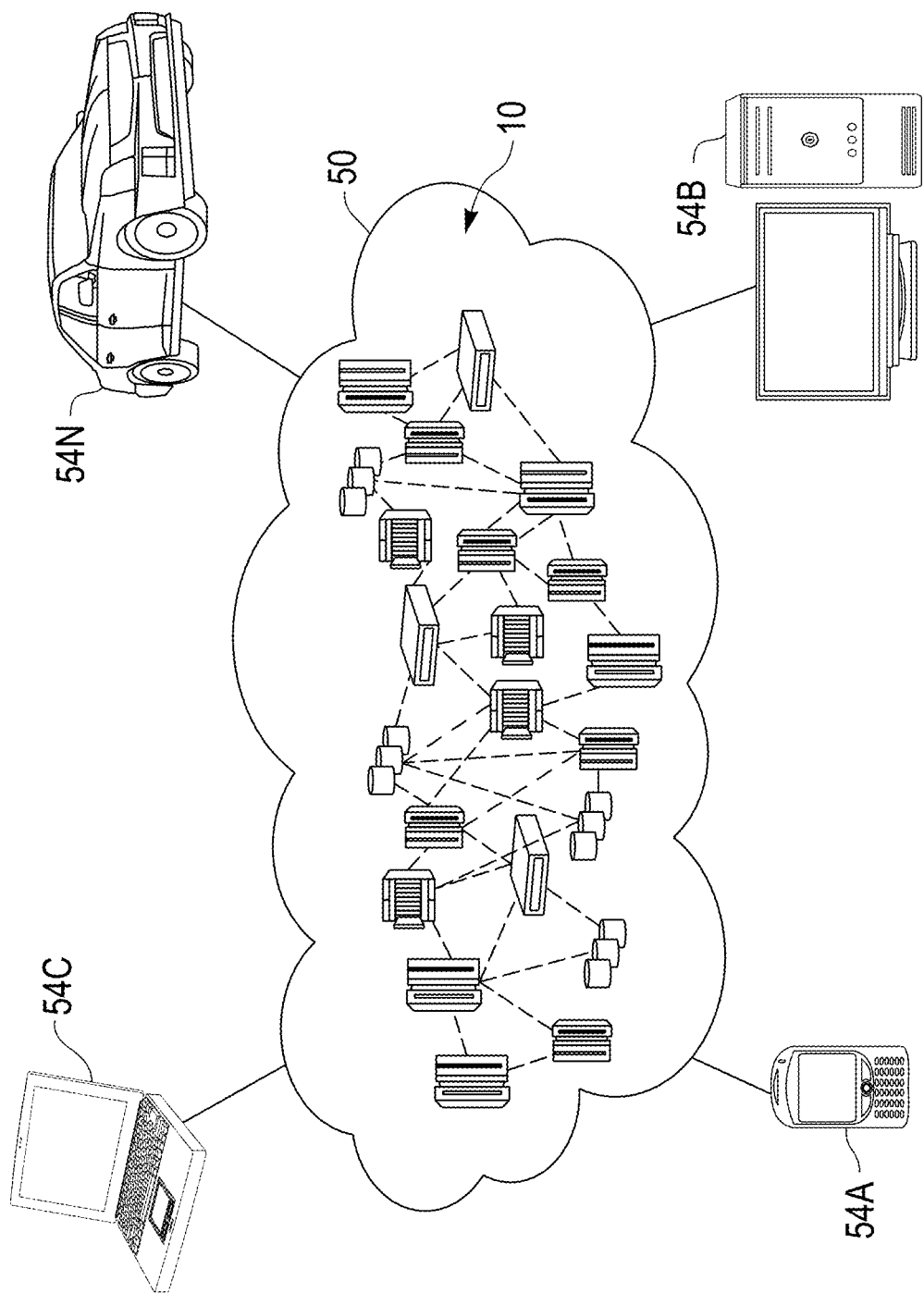
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to user access for sections of an electronic document. One embodiment provides a method of providing, by a computing device, access a user to sections of an electronic document. The method includes receiving, by a computing device, a computerized image of a user accessing an electronic document. The computing device further accesses a facial recognition database and compares the computerized image to one or more entries in the facial recognition database to determine an identity of the user. The user is provided access to one or more sections of the electronic document based upon the identity of the user. Other embodiments include a computer program product for providing access to a user of sections of an electronic document, and an apparatus including a memory for storing instructions and a processor configured to execute the instructions. The method may further include that the user is prevented from accessing one or more further sections of the electronic document based upon the identity of the user. The method may additionally include determining an eye gazing location of the user is determined and the user is provided access to one or more further sections of the electronic document based upon the eye gazing location. In some embodiments, document actions for each user are tracked using metadata. In one or more embodiments, feature values are extracted from the computerized image and from further received computerized images. A machine learning (ML) process is trained using training data including the feature values and user identities associated with the computerized images. An ML data structure is generated using the training data. In some embodiments, access to the one or more sections of the electronic document is determined using the ML data structure. In one embodiment, access to the one or more sections of the electronic document is determined based on each character of the one or more sections of the electronic document. In one or more embodiments, the method may further determine whether a particular user has viewed the one or more sections of the electronic document, and access privileges are assigned on a character by character basis for the one or more sections of the electronic document.

Artificial intelligence (AI) models may include a trained ML model (e.g., models, such as a neural network (NN), a convolutional NN (CNN), a deep NN (DNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
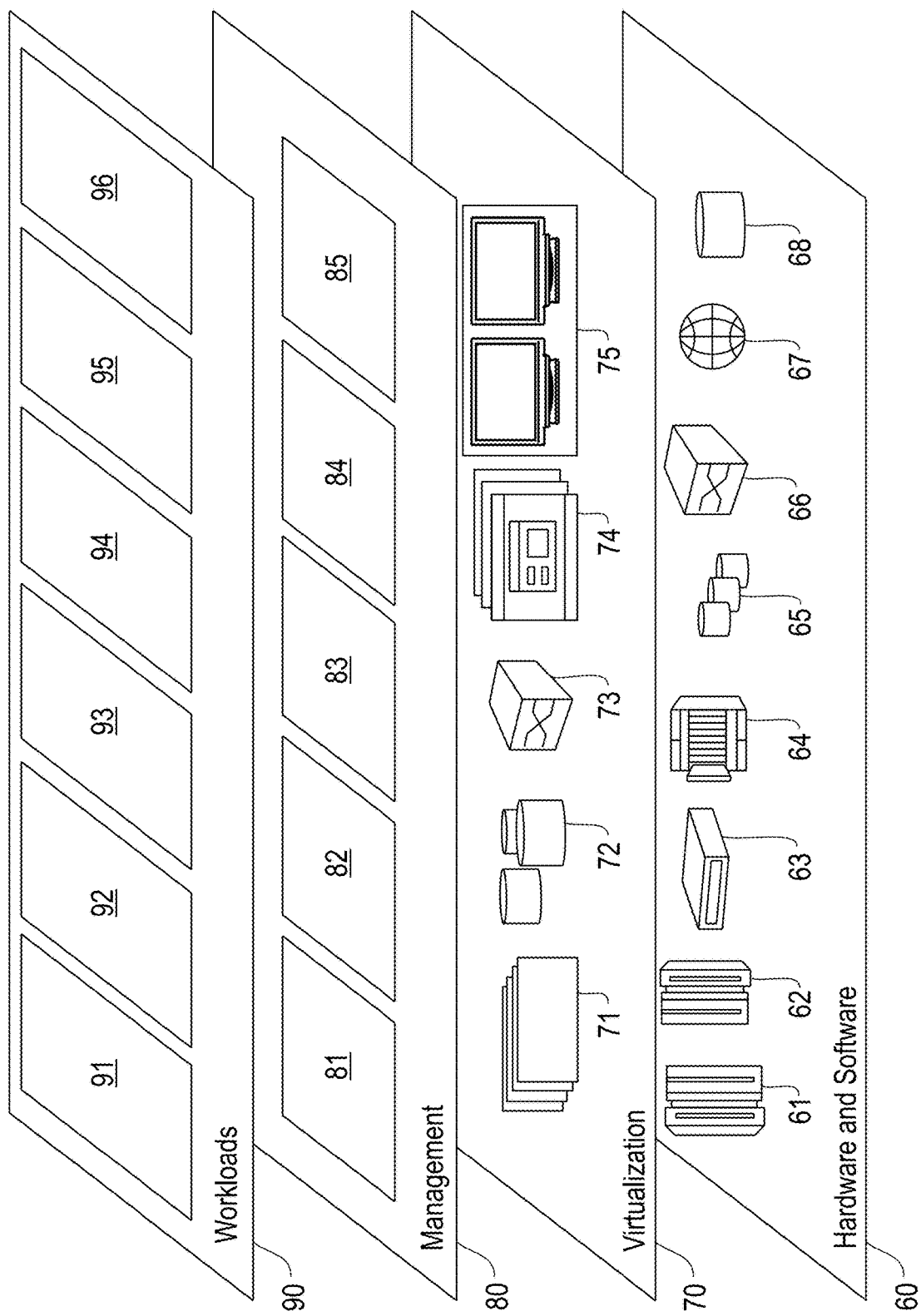
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for user access for sections of an electronic document processing 96 (see, e.g., system 500, FIG. 5, block diagram 700, FIG. 7, block diagram 800, FIG. 8, process 900, FIG. 9, process 1000, FIG. 10 and process 1100, FIG. 11). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
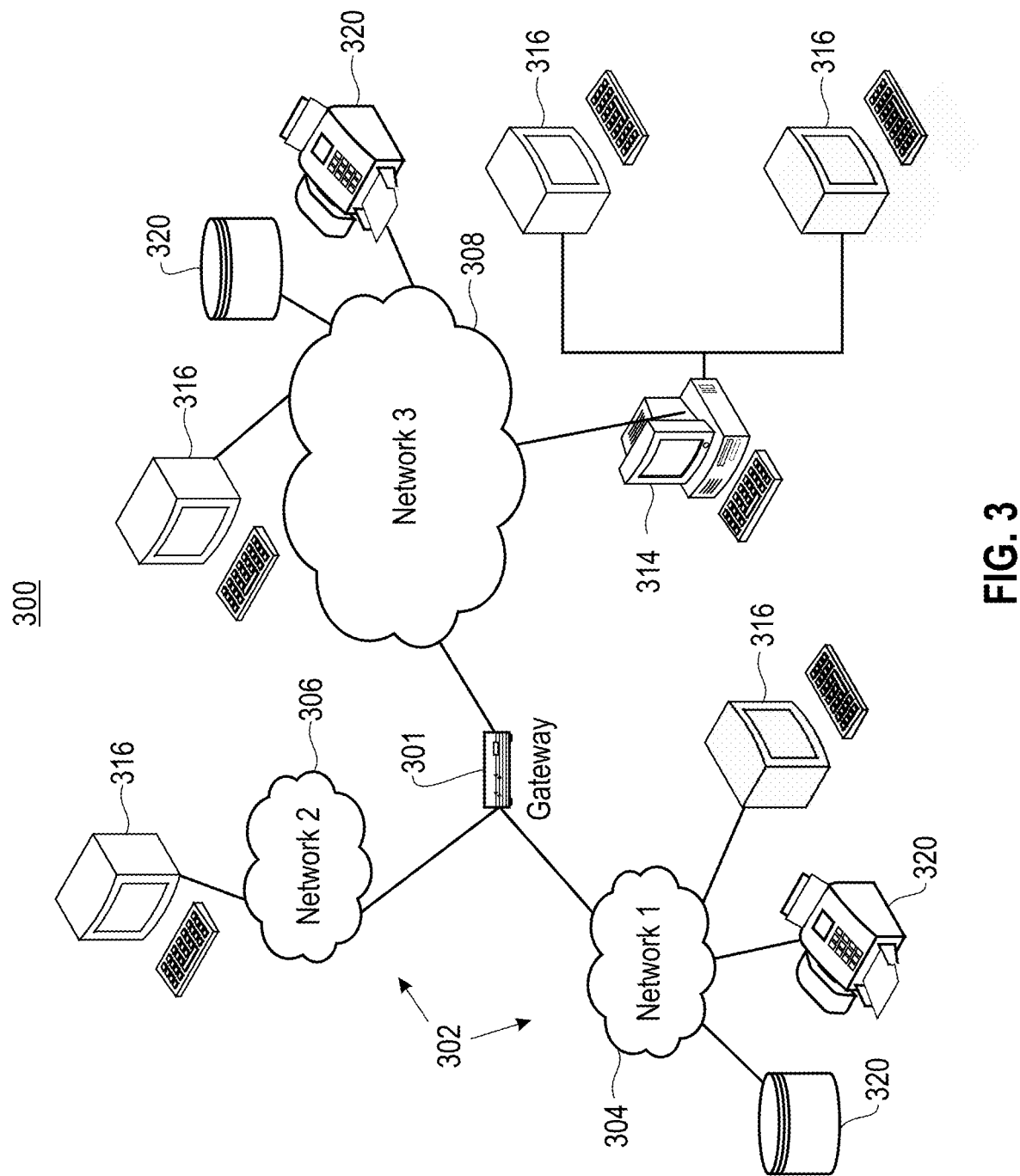
FIG. 3 is a network architecture of a system for user access for sections of an electronic document processing, according to an embodiment.

FIG. 3 is a network architecture of a system 300 for user access for sections of an electronic document processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 4:
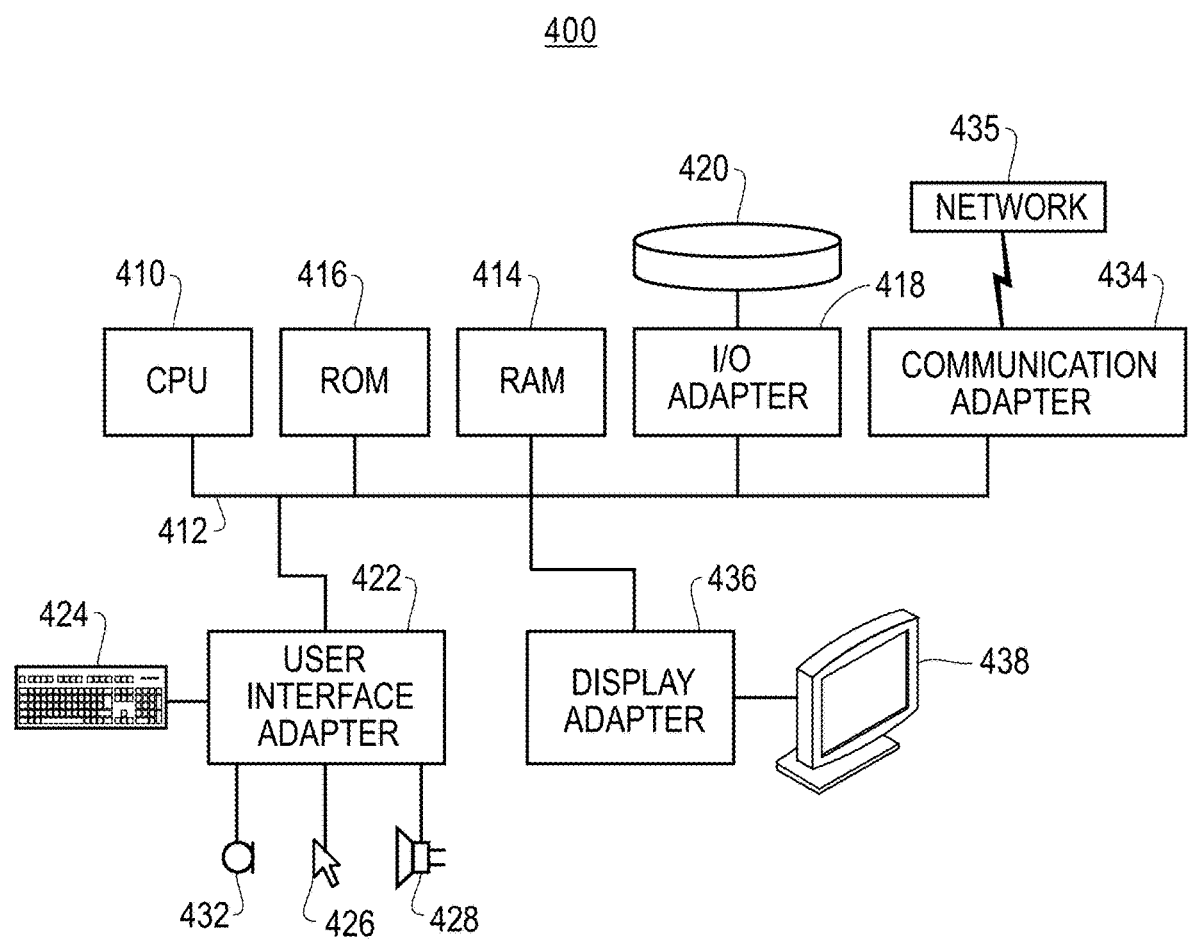
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 5:
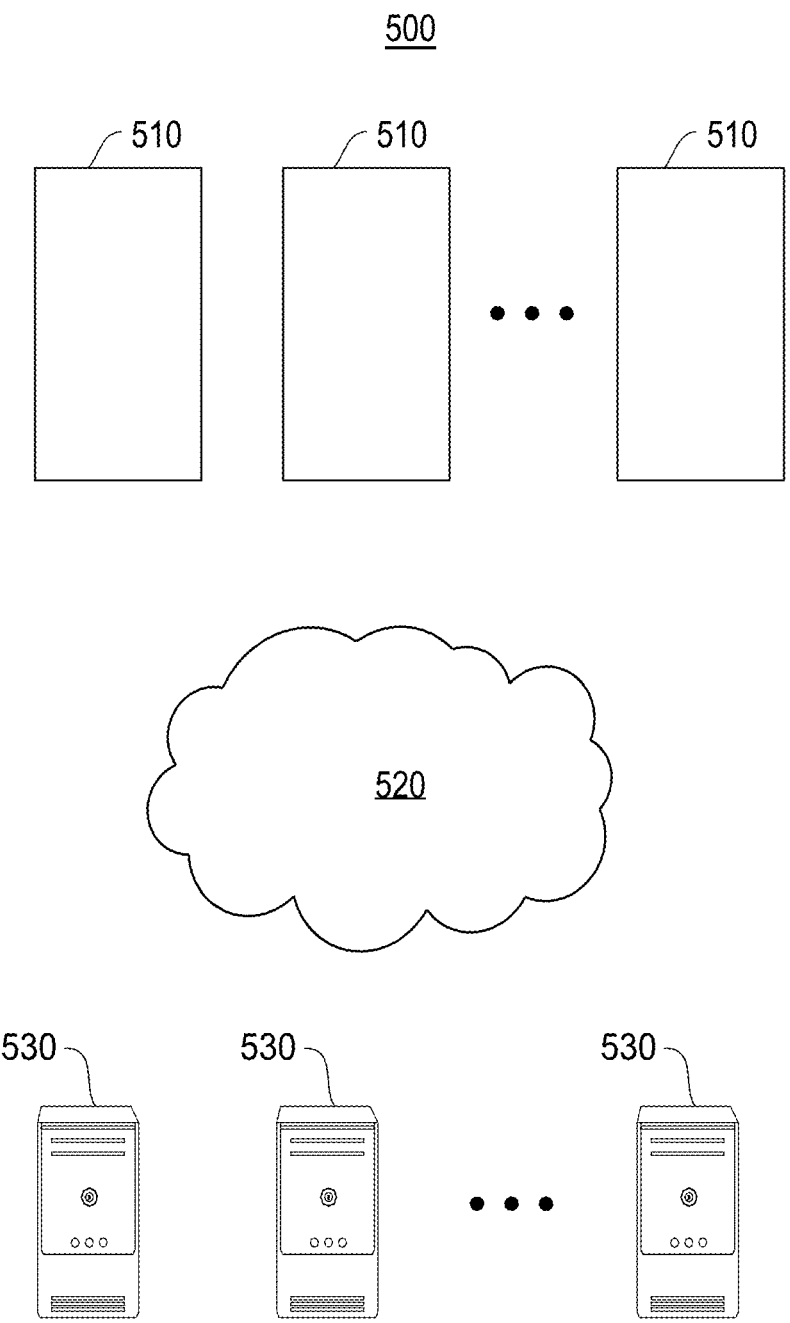
FIG. 5 is a block diagram illustrating a distributed system for user access for sections of an electronic document processing, according to one embodiment.

FIG. 5 is a block diagram illustrating a distributed system 500 for multi-modal DL-based surrogate models for high-fidelity simulation processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

While widely used, existing document security mechanisms have the problem of not being capable of tracing who actually read specific sections of a certain document. Another problem with conventional systems is that individuals who are not permitted to view certain sections of a document actually read them. In one embodiment, the system 500 integrates image processing capabilities into a document security processing to enhance security and improve tracking of identities of users that viewed specific sections of a given document.

Figure 6:
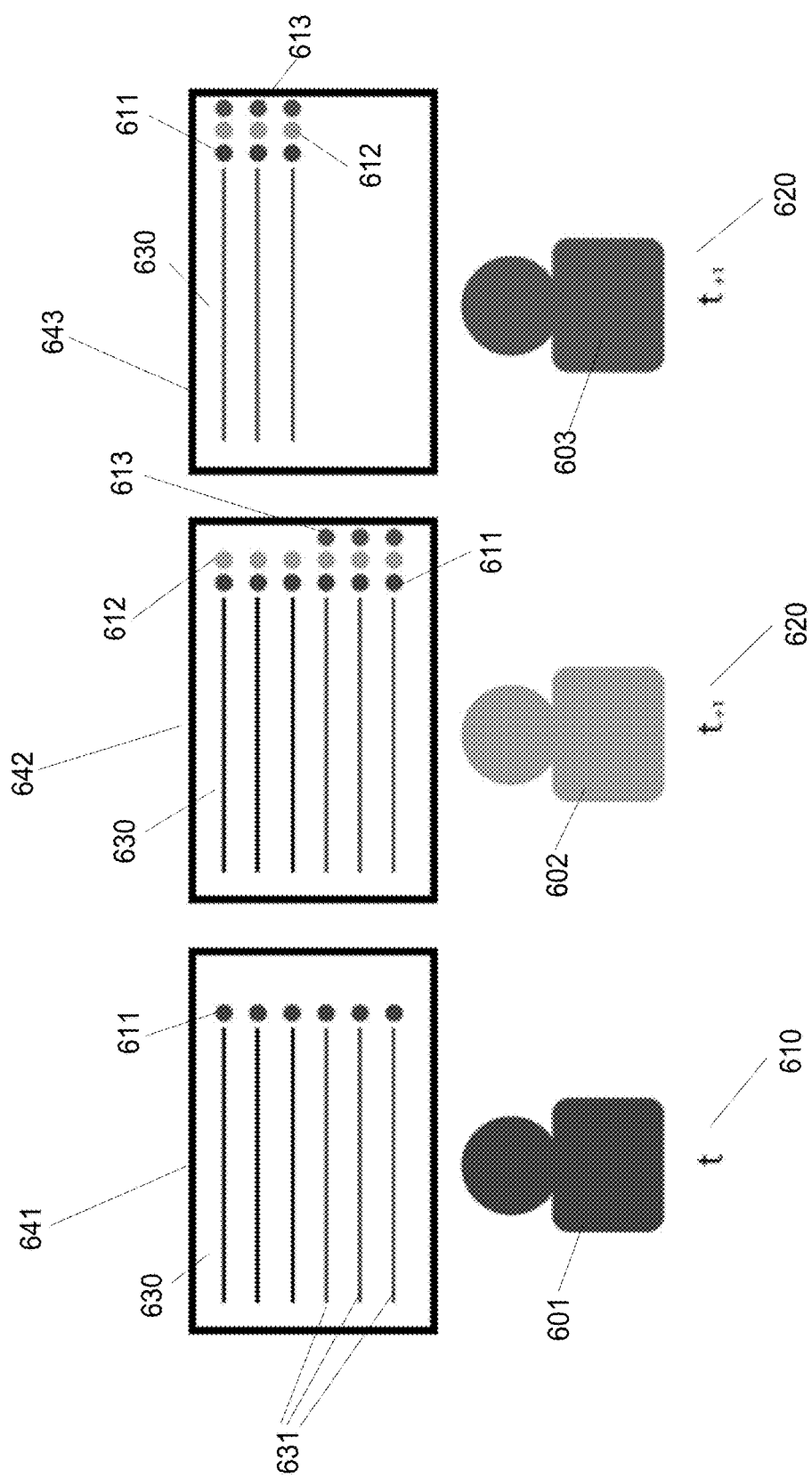
FIG. 6 is an example of multiple users viewing a document at multiple time points, according to one embodiment.

FIG. 6 is an example of multiple users viewing a document (e.g., a word processing document, a spreadsheet or database document, other documents including editable characters, etc.) at multiple time points, according to one embodiment. The multiple users include a first user 601 that accessed the document 630 at time t 610, a second user 602 that accessed the document 630 at time t+1 620, and a third user 603 that accessed the document 630 at time t+1 620. In one embodiment, the processing identifies, in real-time, if more than one user interacts with specific parts (e.g., sections, paragraphs, sentences, characters, etc.) of a document either when the users are located next to a particular computing device or when they are remotely located and use multiple computers. Cameras have been used with facial recognition processing to identify a user identity as well as user facial poses. This technology is integrated with one or more embodiments that use a camera that is enhanced with an advanced image processing that is used to identify at the exact paragraph or word that a user is currently viewing (e.g., using eye gaze recognition processing, head movement, cursor location, etc.).

In one embodiment, the markers (or icons) 611 is associated with the first user 601, the marker (or icon) 612 is associated with the second user 602, and the marker (or icon) 613 is associated with the third user 603. In one embodiment, the markers or icons may be visible or hidden. For example, the markers or icons may be hidden or visible based on privilege, selected view, etc. In one embodiment, the processing enhances security by collecting activities of users when they create new sections or edit current sections by integrating face recognition capabilities using a camera connected to a computing device (e.g., user device 316, FIG. 3, system 400, FIG. 4, client device 510, FIG. 5, etc.). In one embodiment the system processing is capable of identifying who interacts with the document. This is done by continuously capturing the user's face and by using a face recognition processing including image processing and machine learning techniques.

In one embodiment a more advanced image processing algorithm is applied that identifies a user's pose and provides an estimation to which sections of the document the user actually viewed at. In one embodiment, the detection of the viewers gaze, angle of gaze, curser, page on screen, magnification of screen, head position, etc. may be determined using the camera and processing are used for the estimation of the sections of the document the user is actually viewing. ML may be employed using training and continuous learning to improve the estimations. In one embodiment, an eye tracker is integrated with the camera and processing to achieve a higher accuracy. In one embodiment, an image processing ML model is trained by using facial images of all users that could potentially access documents in an organization. Real-time identification processing is capable of capturing a new facial image (using a camera) and, in real-time, provides the user identity associated with the image. The camera may be an integrated component of a mobile computer or installed externally (e.g., on the ceiling).

In one embodiment, the following is an example for access of the document 630 processing by the users 601, 602 and 603. User 601 types his standard credentials and logs into a computing device 641 including a camera (e.g., either integrated or a separate camera connected to the computing device 641). User 601 creates a new textual document 630 and stores it in a repository (e.g., a document server, document access system, secure content management system (e.g., BOX®, etc.)). The camera and processing identify that user 601 is the user that just created the document 630. User 601 types a title and creates three (3) new paragraphs 631. During the creation of the three paragraphs 631, the camera continuously captures facial images of user 601. The system is capable of knowing that user 601 is the only user that created the three paragraphs 631 and stores all edits and deletions made by user 601 and indicated by the markers 611. User 601 grants access to the document 630 for additional users, user 602 and user 603. User 602 types her standard credentials and logs into her computing device 642. User 602 opens the document 630. A camera connected to or integrated with the computing device 642 continuously captures facial images of user 602. The system processing is capable of determining that user 602 just opened the document 630. The system processing determines that user 602 is the only user that is currently accessing the document 630. User 602 reviews the three paragraphs 631 and edits several sentences indicated by the markers 612. User 602 creates a new paragraph (not shown) in the document 630. The system processing determines that user 602 is the user that created the additional paragraph. The system processing determines that user 601 viewed the first three paragraphs, but has yet to view the new paragraph. The system processing additionally determines that user 602 viewed all the first three paragraphs and the new additional paragraph. User 603 types his standard credentials and logs into his computing device 643. User 603 opens the document 630. A camera connected to or integrated with the computing device 643 continuously capturers facial images of user 603. The system processing determines that user 603 just opened the document 630. The system processing determines that user 602 is currently reading the second paragraph in the document 630 and records this information. User 603 reads the first paragraph, but due to an emergency he needs to leave his computing device 643. The system processing determines that user 603 read the first paragraph of the document 630. The system processing determines that user 603 just left his computing device 643 and user 602 is currently reading the third paragraph of the document 630. In this example, user 603 left his computing device 643 unlocked (e.g., user 603 did not log off the computing device 643, etc.). Another user that is currently visiting just noticed that user 603 left the computing device 643 unlocked. The additional user approaches the computing device 643 and views the document 630. Immediately the system processing determines that the additional user is not allowed (e.g., not authorized, does not have privilege or clearance, etc.) to view the document 630 and logs off user 603 from the computing device 643.

In one embodiment, the system processing can determine if an authorized or unauthorized user is covering the camera, obscuring their image or pose, wearing a mask, etc. in an attempt to avoid the system processing from determining whether that user is accessing the document 630. In one embodiment, the system processing can shut down the document 630, change the screen view and display a message or pop-up window that requests information or instructs that the camera cannot detect properly and offer potential solutions. In another embodiment, the system processing may send an alert communication to an administrator or security personnel. In yet another embodiment, the system processing may lock or freeze the account.

Conventional systems do not make use of a camera and image recognition processing to trace the identity of a person that views, edits, or deletes any character, sentence, or paragraph of a document in real-time. The embodiments solve this problem by association at the level of a single character via a secured log-in, and continuously confirms the identity of the user via face recognition in real-time and by associating the user's identity with any action at the character level.

Figure 7:
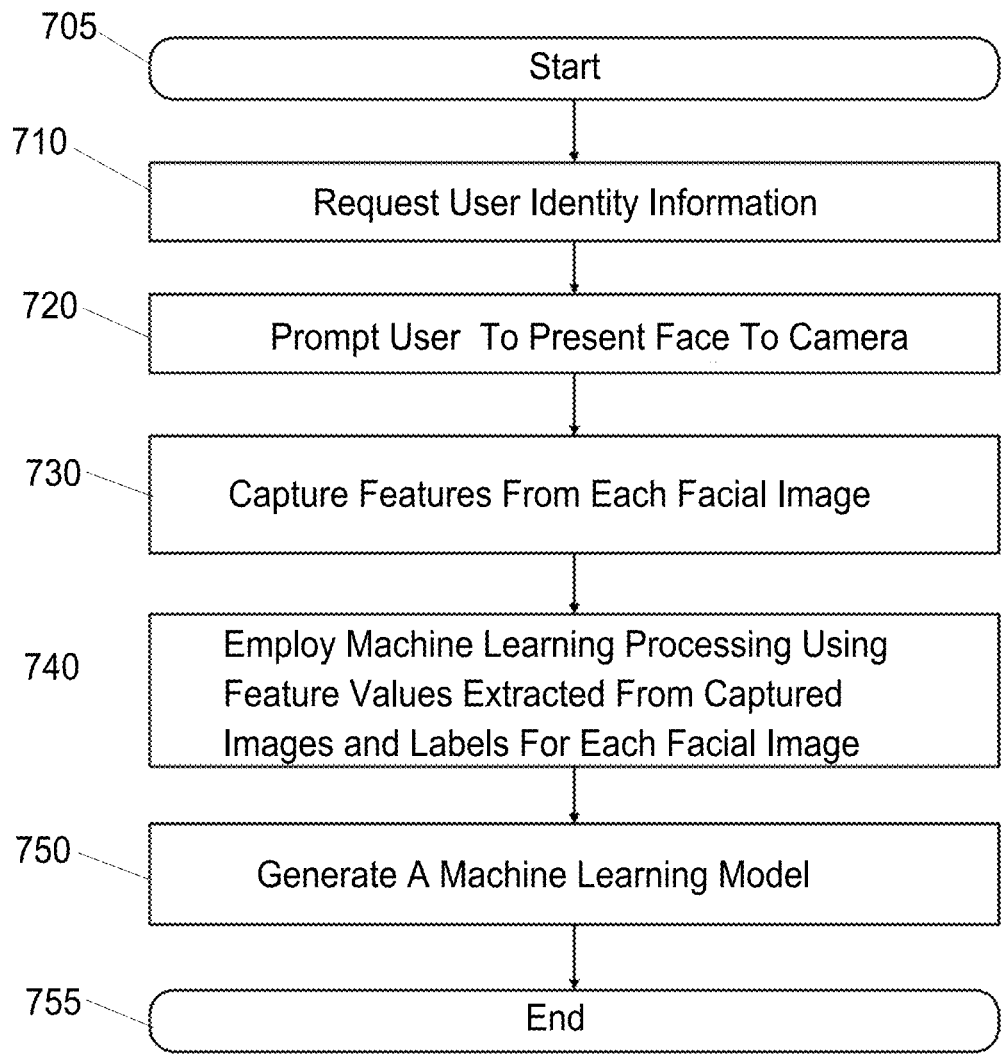
FIG. 7 is a block diagram of a process for training a machine learning model, according to one embodiment.

FIG. 7 is a block diagram of a process 700 for training an ML model, according to one embodiment. In one embodiment, process 700 starts at block 705 where a user attempts to access a document via a computing device (e.g., user device 316, FIG. 3, system 400, FIG. 4, client device 510, FIG. 5, etc.). In block 710, process 700 queries the user to provide his/her identity information, such as full name, personal identification(s) (IDs), etc. In block 720, a camera (integrated with or connected to the computing device) is activated and the user is prompted (requested, asked, etc.) to present their face to the camera view at different angles.

In one embodiment, in block 730 a software process (or mechanism) captures features from each facial image captures (e.g., distance between eyes, eye color, nose size, nose shape, eye shape, skin features (e.g., pigmentation, birth marks, etc.), distances between skin features, etc.). In one embodiment, in block 740 process 700 employs an ML (or AI, etc.) model using feature values extracted from each captured image and the corresponding user identities (referred to as labels) associated with each facial image. In block 750, process 700 generates an ML (or AI, etc.) model. The ML model may be a data structure where querying the data structure with a new image provides for the ML model identifying the identity of the person. An ML mechanism allows a computer to observe large collections of images and their associated features and provide a similarity rank for any new image presented to the mechanism relative to other images that were captured and stored previously. In one embodiment, the ML mechanism is either supervised or an unsupervised model. Examples for ML processing include, but are not limited to: deep learning, NNs, logistic regression, support vector machines, reinforcement learning, etc. In one embodiment, an ML model is a data structure that stores associations between values of features (e.g., level of grayness of a pixel or a group of pixels, distance between pixels and groups of pixels, etc.) and a label. In one embodiment, the label represents an identity of a person. Values of features extracted from any new image of a person may then be queried to the ML model. Querying the ML model with the features extracted from the new image results in a similarity rank (e.g., a number between 0 (not similar) to 1 (very similar)). In one embodiment, if the similarity rank is higher than a pre-defined threshold then the ML model provides the label, i.e., the identity of the person in the image is confirmed. In block 755, process 700 proceeds to end the training process.

Figure 8:
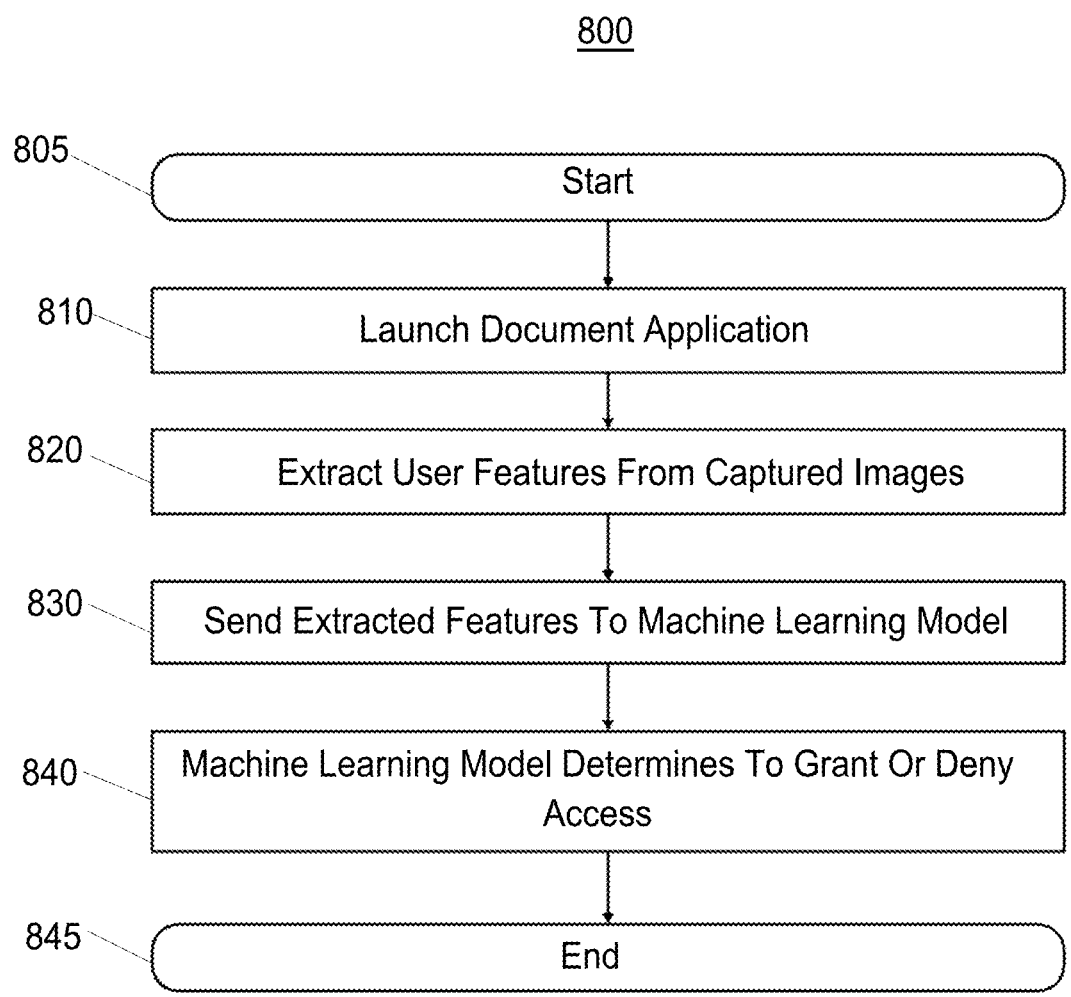
FIG. 8 is a block diagram of a process for identifying a user, according to one embodiment.

FIG. 8 is a block diagram of process 800 for identifying a user, according to one embodiment. In one embodiment, process 800 starts at block 805 where a computing device (e.g., user device 316, FIG. 3, system 400, FIG. 4, client device 510, FIG. 5, etc.) starts process 800 by executing processing, waiting for an interrupt in a background process, etc. In block 810, process 800 a user launches a document application for a document at the computing device that is connected with a camera (e.g., integrated with or connected to, etc.). In block 820, process 800 extracts user features from a captured facial image that occurs while the user is launching the document application for the document. In block 830, process 800 sends or communicates the extracted facial features (e.g., feature values, etc.) to an ML (or AI, etc.) model generated by process 700 (FIG. 7). In block 840, the ML model attempts to identify the identity of the user. If the ML model identifies the user, and the user has access permission for the document, the user is granted access.

Otherwise, the user is prohibited from accessing the document. Process 800 then proceeds to block 845 and ends.

Figure 9:
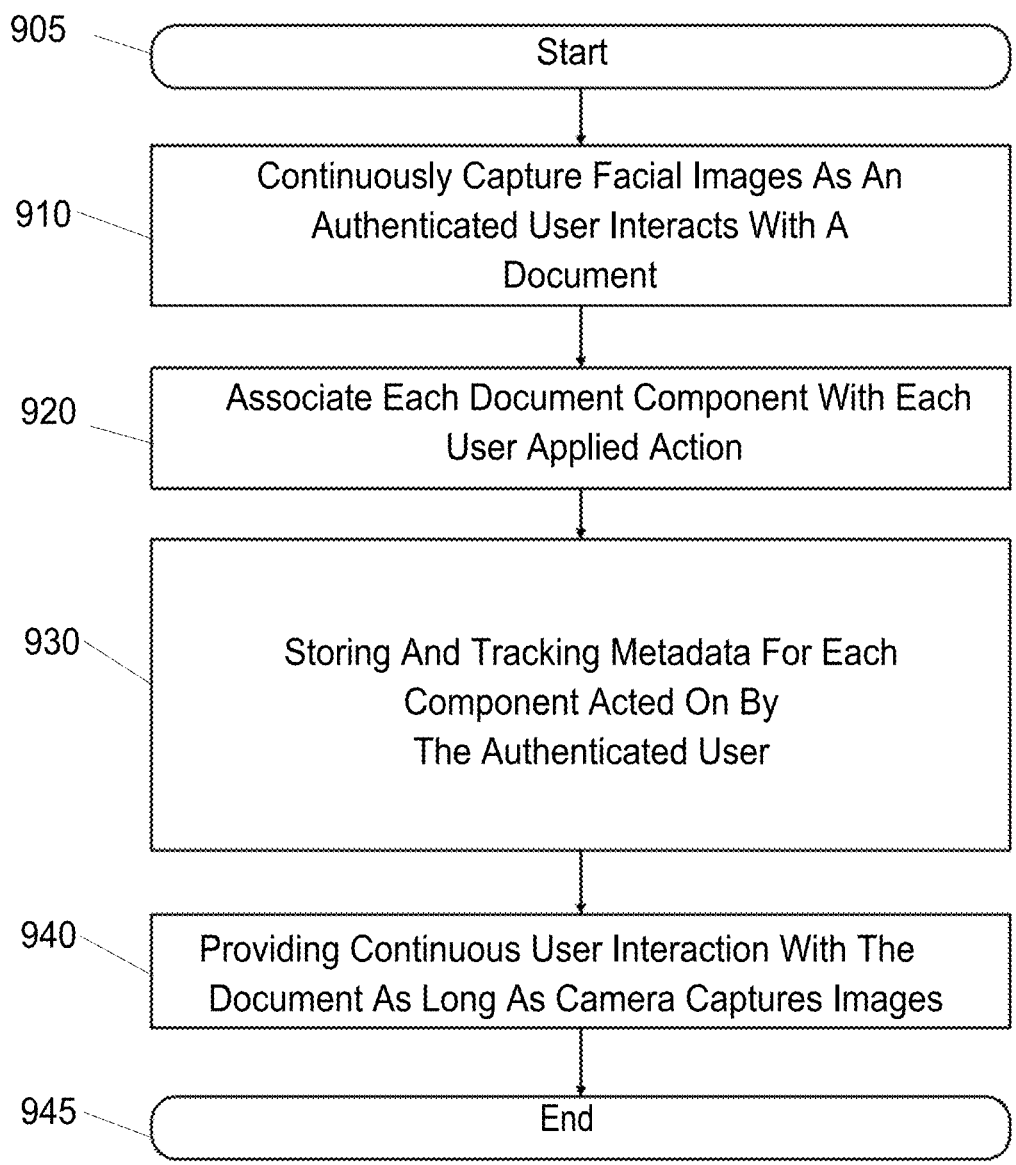
FIG. 9 illustrates a block diagram of a process for tracking a user's interaction, according to one embodiment.

FIG. 9 illustrates a block diagram of a process 900 for tracking a user's interaction, according to one embodiment. In one embodiment, process 900 starts at block 905 where a computing device (e.g., user device 316, FIG. 3, system 400, FIG. 4, client device 510, FIG. 5, etc.) starts process 900 by executing processing, waiting for an interrupt in a background process, etc. In block 910, process 900, an authenticated user (e.g., a user that has been identified and determined to have document access privileges, etc.) interacts with a document in a document application (e.g., word processing application, spreadsheet application, slide presentation application, etc.) as facial images of the user are continuously captured (e.g., at selected intervals, predetermined intervals, etc.), where each facial image is queried by an ML (or AI, etc.) model (e.g., generated via process 700, FIG. 7) or data structure for continuous validation. In block 920, process 900 associates each component or element of the document (e.g., each character, sentence, paragraph, page, etc.) with each user applied action (e.g., adding, deleting, modifying (e.g., font, color, underline, style, etc.), etc.). In block 930, metadata information is stored (and tracked) for each component of the document. In one embodiment, the metadata includes, at least, a character, user, time and action. For example, for a user adding the following: "The objective of this document is . . . ," the metadata includes "T": Uri, Dec. 20, 2019 3:08 PM and 1 millisecond, Action: New; "h": Uri, Dec. 20, 2019 3:08 PM and 2 milliseconds, Action: New; "e": Uri, Dec. 20, 2019 3:08 PM and 3 milliseconds, Action: New; etc. In one embodiment, in block 940 the user continuously interacts with the document as long as the camera is capable of capturing their face, and all actions applied to any component of the document are tracked for Uri. Process 900 then proceeds to block 945 and ends.

Figure 10:
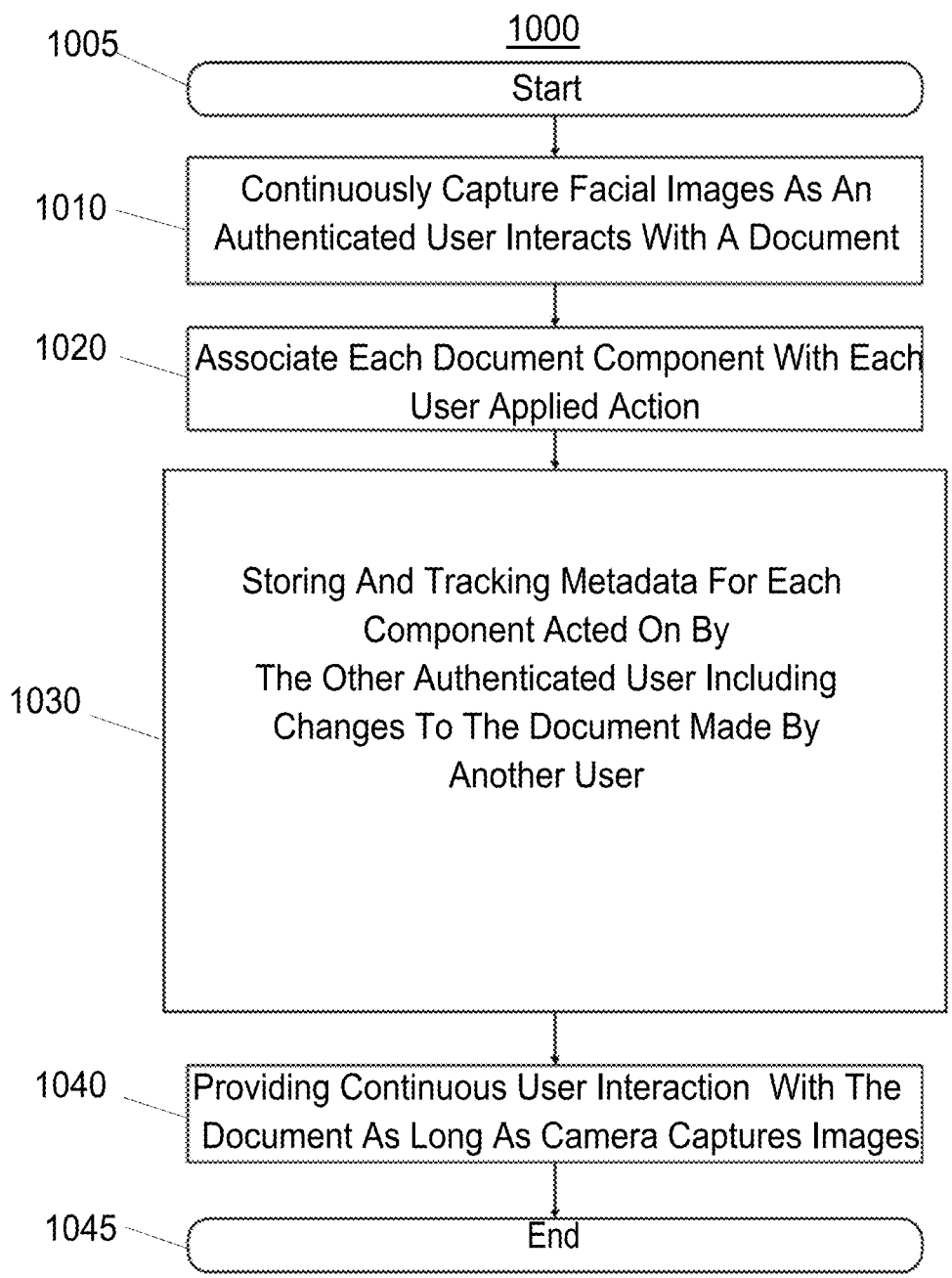
FIG. 10 illustrates a block diagram of a process for tracking another user's interaction, according to one embodiment.

FIG. 10 illustrates a block diagram of a process 1000 for tracking another user's interaction, according to one embodiment. In one embodiment, process 1000 starts at block 1005 where a computing device (e.g., user device 316, FIG. 3, system 400, FIG. 4, client device 510, FIG. 5, etc.) starts process 1000 by executing processing, waiting for an interrupt in a background process, etc. In block 1010, process 1000 a user (e.g., a user that has been identified and determined to have document access privileges, etc.) continuously interacts with a document in a document application (e.g., word processing application, spreadsheet application, slide presentation application, etc.) as facial images of the user are continuously captured (e.g., at selected intervals, predetermined intervals, etc.), where each facial image is queried by an ML (or AI, etc.) model (e.g., generated via process 700, FIG. 7) or data structure for continuous identity validation. In block 1020, process 1000 associates each component or element of the document (e.g., each character, sentence, paragraph, page, etc.) with each user applied action (e.g., adding, deleting, modifying (e.g., font, color, underline, style, etc.), etc.). In block 1030, metadata information is stored (and tracked) for each component of the document. In one embodiment, the metadata includes, at least, a character, user, time and action. For example, for a user (e.g., Mauro) modifying the sentence "The objective of this document is . . . " to "The objective of the document is," the metadata may include:

"T": Mauro, Dec. 20, 2019 3:08 PM and 1 millisecond, Action: Viewed;
"h": Mauro, Dec. 20, 2019 3:08 PM and 2 milliseconds, Action: Viewed;
"e": Mauro, Dec. 20, 2019 3:08 PM and 3 milliseconds, Action: Viewed; etc.;
"t": Mauro, Dec. 20, 2019 3:12 PM and 64 milliseconds, Action: Deleted;
"h": Mauro, Dec. 20, 2019 3:12 PM and 64 milliseconds, Action: Deleted;
"i": Mauro, Dec. 20, 2019 3:12 PM and 66 milliseconds, Action: Deleted;
"s": Mauro, Dec. 20, 2019 3:12 PM and 67 milliseconds, Action: Deleted;
"t": Mauro, Dec. 20, 2019 3:12 PM and 64 milliseconds, Action: New;
"h": Mauro, Dec. 20, 2019 3:12 PM and 66 milliseconds, Action: New;
"e": Mauro, Dec. 20, 2019 3:12 PM and 67 milliseconds, Action: New; etc.

In one embodiment, in block 1040 the user continuously interacts with the document as long as the camera is capable of capturing their face, and all actions applied to any component of the document are tracked for Mauro. Process 1000 then proceeds to block 1045 and ends.

FIG. 11 illustrates a block diagram of a process 1100 for document security enhancement, according to one embodiment. In one embodiment, in block 1110 process 1100 receives, by a computing device (from computing node 10, FIG. 1, hardware and software layer 60, FIG. 2, processing system 300, FIG. 3, system 400, FIG. 4, system 500, FIG. 5, etc.) a computerized image (e.g., captured by a camera integrated with or connected with the computing device) of a user accessing an electronic document (e.g., a word processing document, a spreadsheet document, a presentation document, etc.). In block 1120, process 1100 further provides for accessing, by the computing device, a facial recognition database (e.g., an ML data structure or model, AI data structure or model, etc.) and comparing the computerized image to one or more entries in the facial recognition database to determine an identity of the user. In block 1130, process 1100 further provides for providing the user access to one or more sections (e.g., one or more characters, sentences, paragraphs, pages, etc.) of the electronic document based upon the identity of the user.

In one embodiment, process 1100 may further include the feature of preventing the user from accessing one or more further sections of the electronic document based upon the identity of the user. Process 1100 may still further include the feature of determining an eye gazing location of the user and providing the user access to one or more further sections of the electronic document based upon the eye gazing location.

In one embodiment, process 1100 may further include the feature of tracking document actions (e.g., viewing, adding new characters, sentences, paragraphs, etc., deleting characters, sentences, paragraphs, etc., changing characters, sentences, paragraphs, etc.) for each user using metadata (e.g., character, user, time of action, type of action, etc.).

In one embodiment, process 1100 may additionally include the feature of extracting feature values (e.g., from features, such as distance between eyes, eye color, nose size, nose shape, eye shape, skin features (e.g., pigmentation, birth marks, etc.), distances between skin features, etc.)) from the computerized image and from further received computerized images. In one embodiment, process 1100 may further include the feature of training an ML process using training data including the feature values and user identities (e.g., labels) associated with the computerized images, and generating an ML data structure (or model) using the training data.

In one embodiment, process 1100 may additionally include the feature of determining access to the one or more sections of the electronic document using the ML data structure (or model). Process 1100 may still further include the feature that access to the one or more sections of the electronic document is determined based on each character of the one or more sections of the electronic document.

In one embodiment, process 1100 may further include the feature of determining whether a particular user has viewed (e.g., based on eye gaze capturing, head pose capturing, etc.) the one or more sections of the electronic document, and assigning access privileges on a character by character basis for the one or more sections of the electronic document.

In some embodiments, the features described above contribute to the advantage of employing image processing and face recognition techniques, the system processing provides an increased security for creating, accessing, editing, and viewing textual documents. The features further contribute to the advantage of achieving significant increased security levels over existing document-security methods. The features still further contribute to the advantage of monitoring a document at the level of individual text characters by assigning all user identities that are associated with each character of a document.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers, A network adapter card or network interface in each computing/processing device receives computer readable program instructions from the network and forwards the computer readable program instructions for storage in a computer readable storage medium within the respective computing/processing, device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of providing, by a computing device, access to a user of sections of an electronic document, the method comprising;
continuously receiving, by a computing device, a computerized image of a user accessing an electronic document;
accessing, by the computing device, a facial recognition database and continuously comparing the computerized image to one or more entries in the facial recognition database to determine an identity of the user;
providing the user access to one or more sections of the electronic document based upon the identity of the user, wherein access privilege to the one or more sections of the electronic document is assigned based on user identity and on a character by character basis of the one or more sections of the electronic document, and user access is continuously determined on a character by character basis using a current determination of the identity;
identifying multiple users viewing specific sections of the electronic document; and
preventing access, by the computing device, to at least one of the multiple users viewing the specific sections due to the at least one of the multiple users being unauthorized for at least one character of at least one of the specific sections.

2. The method of claim 1, further comprising preventing the user from accessing one or more further sections of the electronic document based upon the identity of the user.

3. The method of claim 1, further comprising:
determining an eye gazing location of the user and providing the user access to one or more further sections of the electronic document based upon the eye gazing location.

4. The method of claim 1, further comprising tracking document actions for each user using metadata.

5. The method of claim 4, further comprising:
extracting feature values from the computerized image and from further received computerized images;
training a machine learning process using training data comprising the feature values and user identities associated with the computerized images; and
generating a machine learning data structure using the training data.

6. The method of claim 5, further comprising:
determining access to the one or more sections of the electronic document using the machine learning data structure.

7. The method of claim 6, wherein access to the one or more sections of the electronic document is continuously determined based on an action performed on each character of the one or more sections of the electronic document.

8. The method of claim 6, further comprising:
determining whether a particular user has viewed the one or more sections of the electronic document;
wherein preventing access comprises logging off the at least one of the multiple users from a particular computing device used for viewing the one or more sections of the electronic document.

9. A computer program product for providing access to a user of sections of an electronic document, the computer program product comprising a computer readable storage medium having program instructions embodied therewith, the program instructions executable by a processor to cause the processor to:
continuously receive, by the processor, a computerized image of a user accessing an electronic document;
access, by the processor, a facial recognition database and continuously comparing the computerized image to one or more entries in the facial recognition database to determine an identity of the user;
provide, by the processor, the user access to one or more sections of the electronic document based upon the identity of the user, wherein access privilege to the one or more sections of the electronic document is assigned based on user identity and on a character by character basis of the one or more sections of the electronic document, and user access is continuously determined on a character by character basis using a current determination of the identity;

identify, by the processor, multiple users viewing specific sections of the electronic document; and prevent access, by the processor, to at least one of the multiple users viewing the specific sections due to the at least one of the multiple users being unauthorized for at least one character of at least one of the specific sections.

10. The computer program product of claim 9, wherein the program instructions executable by the processor further cause the processor to:

prevent, by the processor, the user from accessing one or more further sections of the electronic document based upon the identity of the user.

11. The computer program product of claim 9, wherein the program instructions executable by the processor further cause the processor to:

determine, by the processor, an eye gazing location of the user and providing the user access to one or more further sections of the electronic document based upon the eye gazing location; and track, by the processor, document actions for each user using metadata.

12. The computer program product of claim 11, wherein the program instructions executable by the processor further cause the processor to:

extract, by the processor, feature values from the computerized image and from further received computerized images;

train, by the processor, a machine learning process using training data comprising the feature values and user identities associated with the computerized images; and generate, by the processor, a machine learning data structure using the training data.

13. The computer program product of claim 12, wherein the program instructions executable by the processor further cause the processor to:

determine, by the processor, access to the one or more sections of the electronic document using the machine learning data structure;

wherein access to the one or more sections of the electronic document is continuously determined based on an action performed on each character of the one or more sections of the electronic document.

14. The computer program product of claim 13, wherein the program instructions executable by the processor further cause the processor to:

determine, by the processor, whether a particular user has viewed the one or more sections of the electronic document;

wherein prevention of access comprises logging off the at least one of the multiple users from a particular computing device used for viewing the one or more sections of the electronic document.

15. An apparatus comprising:
a memory configured to store instructions; and
a processor configured to execute the instructions to:
continuously receive a computerized image of a user accessing an electronic document;
access a facial recognition database and continuously comparing the computerized image to one or more entries in the facial recognition database to determine an identity of the user;
provide the user access to one or more sections of the electronic document based upon the identity of the user, wherein access privilege to the one or more sections of the electronic document is assigned based on user identity and on a character by character basis of the one or more sections of the electronic document, and user access is continuously determined on a character by character basis using a current determination of the identity;
identify multiple users viewing specific sections of the electronic document; and
prevent access to at least one of the multiple users viewing the specific sections due to the at least one of the multiple users being unauthorized for at least one character of at least one of the specific sections.

16. The apparatus of claim 15, wherein the processor is further configured to execute the instructions to:
prevent the user from accessing one or more further sections of the electronic document based upon the identity of the user;
determine an eye gazing location of the user and providing the user access to one or more further sections of the electronic document based upon the eye gazing location; and
track document actions for each user using metadata.

17. The apparatus of claim 16, wherein the processor is further configured to execute the instructions to:
extract feature values from the computerized image and from further received computerized images;
train a machine learning process using training data comprising the feature values and user identities associated with the computerized images; and
generate a machine learning data structure using the training data.

18. The apparatus of claim 17, wherein the processor is further configured to execute the instructions to:
determine, by the processor, access to the one or more sections of the electronic document using the machine learning data structure.

19. The apparatus of claim 17, wherein access to the one or more sections of the electronic document is continuously determined based on an action performed on each character of the one or more sections of the electronic document.

20. The apparatus of claim 17, wherein the processor is further configured to execute the instructions to:
determine whether a particular user has viewed the one or more sections of the electronic document;
wherein prevention of access comprises logging off the at least one of the multiple users from a particular computing device used for viewing the one or more sections of the electronic document.

* * * * *